United States Patent
Brück et al.

(10) Patent No.: US 8,407,990 B2
(45) Date of Patent: Apr. 2, 2013

(54) EVAPORATION UNIT FOR PRODUCING A GAS INCLUDING AT LEAST ONE REDUCING AGENT PRECURSOR AND/OR A REDUCING AGENT AND DEVICE AND MOTOR VEHICLE HAVING THE EVAPORATION UNIT

(75) Inventors: Rolf Brück, Bergisch Gladbach (DE); Jan Hodgson, Troisdorf (DE); Sven Schepers, Troisdorf (DE); Christian Vorsmann, Köln (DE); Marc Brugger, Neunkirchen (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 21 days.

(21) Appl. No.: 12/870,958

(22) Filed: Aug. 30, 2010

(65) Prior Publication Data

US 2011/0023470 A1 Feb. 3, 2011

Related U.S. Application Data

(63) Continuation of application No. PCT/EP2009/052362, filed on Feb. 27, 2009.

(30) Foreign Application Priority Data

| Feb. 29, 2008 | (DE) | 10 2008 012 087 |
| Mar. 6, 2008 | (DE) | 10 2008 012 972 |
| May 16, 2008 | (DE) | 10 2008 023 938 |

(51) Int. Cl.
 *F01N 3/00* (2006.01)
(52) U.S. Cl. .............. 60/295; 60/286; 60/301
(58) Field of Classification Search .......... 60/286, 60/295, 301, 303
 See application file for complete search history.

(56) References Cited

U.S. PATENT DOCUMENTS

| 4,071,935 A * | 2/1978 | Molitor ............ 29/890.03 |
| 4,477,715 A | 10/1984 | Bell et al. |

(Continued)

FOREIGN PATENT DOCUMENTS

| DE | 3506759 C1 * | 9/1986 |
| DE | 4038054 A1 | 6/1992 |
| DE | 19855385 A1 | 6/2000 |

(Continued)

OTHER PUBLICATIONS

International Search Report of PCT/EP2009/052362, Dated Jul. 27, 2009.

*Primary Examiner* — Thomas Denion
*Assistant Examiner* — Patrick Maines
(74) *Attorney, Agent, or Firm* — Laurence A. Greenberg; Werner H. Stemer; Ralph E. Locher (57) ABSTRACT

An evaporation unit for evaporating an aqueous solution including at least one reducing agent precursor, includes at least one evaporator cavity defined by a wall made of a material containing titanium. A heat-imparting layer disposed outside the evaporator cavity is made of a material having a thermal conductivity of at least 100 W/mK (Watts per meter and Kelvin) and is connected to the evaporator cavity in a heat-conducting manner. A heating layer disposed outside the heat-imparting layer is connected in a materially integral manner to the heat-imparting layer. The evaporator unit can be controlled in a highly dynamic manner, thereby enabling a sufficiently high amount of ammonia to be produced even during rapid load changes and consequently significant increases in the concentration of nitric oxide in the exhaust gas of the internal combustion engine. A device and a motor vehicle having the evaporation unit are also provided.

19 Claims, 5 Drawing Sheets

U.S. PATENT DOCUMENTS

| | | | |
|---|---|---|---|
| 6,878,359 B1 * | 4/2005 | Mathes et al. | 423/239.1 |
| 8,261,537 B2 * | 9/2012 | Osbat et al. | 60/286 |
| 2003/0188855 A1 | 10/2003 | Maeda et al. | |
| 2005/0069476 A1 | 3/2005 | Blakeman et al. | |
| 2005/0217247 A1 * | 10/2005 | Simpson et al. | 60/286 |
| 2008/0041036 A1 | 2/2008 | Witte-Merl | |
| 2008/0230184 A1 * | 9/2008 | Eigenberger et al. | 159/7 |
| 2008/0302088 A1 * | 12/2008 | Koehler et al. | 60/286 |
| 2009/0120078 A1 * | 5/2009 | Bruck et al. | 60/299 |
| 2009/0127511 A1 * | 5/2009 | Bruck et al. | 252/372 |
| 2010/0092162 A1 | 4/2010 | Hirth et al. | |
| 2011/0219756 A1 * | 9/2011 | Hodgson et al. | 60/301 |

FOREIGN PATENT DOCUMENTS

| | | |
|---|---|---|
| DE | 10 2006 023 146 A1 | 11/2007 |
| DE | 102006023147 A1 | 1/2008 |
| DE | 102006038904 A1 | 2/2008 |
| JP | 2000-320997 * | 11/2000 |
| WO | WO 2006125417 * | 11/2006 |
| WO | WO 2007131784 * | 11/2007 |
| WO | 2008/138756 A1 | 11/2008 |

* cited by examiner

EVAPORATION UNIT FOR PRODUCING A GAS INCLUDING AT LEAST ONE REDUCING AGENT PRECURSOR AND/OR A REDUCING AGENT AND DEVICE AND MOTOR VEHICLE HAVING THE EVAPORATION UNIT

CROSS-REFERENCE TO RELATED APPLICATION

This is a continuation, under 35 U.S.C. §120, of copending International Application No. PCT/EP2009/052362, filed Feb. 27, 2009, which designated the United States; this application also claims the priority, under 35 U.S.C. §119, of German Patent Applications DE 10 2008 012 087.1, filed Feb. 29, 2008, DE 10 2008 012 972.0, filed Mar. 6, 2008, and DE 10 2008 023 938.0, filed May 16, 2008; the prior applications are herewith incorporated by reference in their entirety.

BACKGROUND OF THE INVENTION

Field of the Invention

The present invention relates to an evaporation unit for producing a gas stream which includes a reducing agent precursor, such as, for example, urea, and/or a reducing agent, such as, for example, ammonia. Such an evaporation unit is used particularly for the provision of gaseous ammonia from an ammonia precursor, particularly in liquid and/or solid form. The invention is also used particularly in the context of exhaust gas aftertreatment in motor vehicles and therefore also relates to a device and a motor vehicle having the evaporation unit.

Particularly in diesel internal combustion engines, it has proved to be appropriate to directly add urea in aqueous solution or to add ammonia after exhaust gas-external hydrolysis, to the exhaust gas generated by the internal combustion engine. In that case, in known methods, a hydrolysis catalytic converter is employed, at which ammonia is obtained from the urea. The aqueous urea solution is added upstream of the hydrolysis catalytic converter, converted into the gaseous state and brought into contact with the hydrolysis catalytic converter. The ammonia generated in that case then reacts, for example, through the use of a so-called SCR catalytic converter further downstream in the exhaust gas stream, with the nitrogen oxides contained there, so as to form molecular nitrogen and water.

It is especially difficult to manage temperature in the evaporation of the aqueous urea solution. That applies especially when the required quantities of urea solution, on one hand, and the available temperatures in the exhaust gas, on the other hand, vary greatly, for example during mobile use. If evaporation is not achieved completely, intermediate products may be formed which may possibly lead to blockage of the evaporation unit. Undesirable byproducts of that type are, for example, water-insoluble biuret, which is formed from isocyanic acid and urea, and cyanuric acid, which constitutes the trimerizing product of the isocyanic acid. In the evaporation of an ammonia precursor, in particular of a liquid urea/water solution, it was observed that the application of heat treatment to the liquid must take place very quickly over and above a critical temperature range in order to avoid the formation of the undesirable compounds which sometimes can only be removed with great difficulty.

Devices for the exhaust gas-external treatment of a urea/water solution have already been described, but they have heretofore not been convincing, at least for use in the automobile sector. The known evaporation devices sometimes cannot ensure, in that case, the desired completeness of evaporation over all of the operating states and/or quantities of the ammonia precursor to be evaporated. That is true especially when there is highly dynamic regulation of the evaporation unit, taking operating states of a mobile internal combustion engine, such as, for example, in a diesel engine into account.

SUMMARY OF THE INVENTION

It is accordingly an object of the invention to provide an evaporation unit for producing a gas including at least one reducing agent precursor and/or a reducing agent and a device and a motor vehicle having the evaporation unit, which overcome the hereinafore-mentioned disadvantages of and at least partially solve the problems arising with regard to the heretofore-known units, devices and vehicles of this general type. In particular, an evaporation unit is to be specified which highly dynamically provides a rapid and complete evaporation of a urea/water solution for producing a gas stream including ammonia, in exactly predetermined quantities. At the same time, the evaporation unit needs to have a compact and simple construction. Moreover, it is desirable that the evaporation unit be capable of being produced cost-effectively.

With the foregoing and other objects in view there is provided, in accordance with the invention, an evaporation unit for the evaporation of an aqueous solution including at least one reducing agent precursor. The evaporation unit comprises a wall made of a material including titanium, which delimits at least one evaporator cavity or chamber. A heat-imparting layer made of a material with a thermal conductivity of at least 100 W/mK (Watts per meter and Kelvin) lies outside the evaporator cavity and is thermally conductively connected to the evaporator cavity. A heating layer is disposed outside of the heat-imparting layer and is materially integrally connected to the heat-imparting layer.

A reducing agent precursor is understood in this case to mean, in particular, urea, preferably urea in aqueous solution. This aqueous solution may contain further constituents, in particular further urea precursors, such as, for example, ammonium formate or the like. The evaporation unit according to the invention is, in particular, part of a line section of an additional system issuing to the exhaust line. The inside of the wall of the evaporator chamber or cavity is therefore preferably lined with titanium material or the evaporator cavity is surrounded by the titanium material. The titanium material may in this case also be formed as a layer or (separate) material as far as the evaporator cavity or even inside the evaporator cavity. Preferably, the inner contact surface of the evaporator cavity is produced with more than 80% titanium (alloys), in particularly substantially completely (>98%). What is meant herein by "titanium" is, in particular, also oxides of titanium which, where appropriate, form an upper layer.

Titanium being used as the material of the evaporator cavity has very poor thermal conductivity. Therefore, in order to ensure that sufficient heat can be introduced into the fluid to be evaporated, the heat-imparting layer is formed from a material with a thermal conductivity of at least 100 W/mK, preferably of more than 100 W/mK, in particular more than 400 W/mK. Heat-imparting layers formed of copper and/or aluminum are preferred in this case. The heat-imparting layer can, in particular, easily be sealed in, so that the evaporator cavity is cast inside the heat-imparting layer. A thermally conductive connection between the heat-imparting layer and the evaporator cavity is understood, in particular, to mean that the evaporator cavity is in close contact with the heat-imparting layer, so that conductive thermal conduction between the imparting layer and the evaporator cavity can take place. Due to the heating layer formed outside the heat-imparting layer, the heat-imparting layer is heated during operation. Through the use of the heat-imparting layer, the evaporator cavity and the fluid present inside this evaporator cavity are also heated at the same time. Due to the contact of the urea/water solution with the wall of the evaporator cavity, the urea/water solution is heated and evaporated. The vapor can then be heated further, although partial conversion of urea into ammonia already occurs particularly because of the formation of titanium oxide on the surface of the wall.

In accordance with another advantageous feature of the evaporation unit of the invention, the heat-imparting layer has at least one externally continuous recess, into which at least one heating conductor is inserted and brazed to the heat-imparting layer.

It is preferable in this case that the heat-imparting layer have on the outside a thread-like recess, into which a heating conductor or a plurality of heating conductors is or are wound continuously around the heat-imparting layer onto the heat-imparting layer. Highly uniform heating of the heat-imparting layer can thus take place.

In this case, a refinement is preferred in which at least two evaporation sections and, correspondingly, two heating zones are formed in the heating layer. This means that the heating layer is constructed in such a way that the heating zones can be operated separately from one another. Thus, in particular, it is possible to operate the heating layer and therefore the evaporation unit at a first temperature of, for example, 150 to 180° C. in the first partial region (first heating zone) and at a markedly higher temperature, such as, for example, 350 to 380° C., in a second partial region (second heating zone). This structure in the form of a plurality of partial regions (heating zones) can be achieved, for example, by winding two heating conductors into the recess, a first heating conductor forming the first heating zone and a second heating conductor forming the second heating zone.

In accordance with a further advantageous feature of the evaporation unit of the invention, the heating layer includes at least one self-regulating heating resistor. A self-regulating heating resistor is understood, in particular, to mean a PTC resistor (PTC: positive temperature coefficient). This is understood to mean a positive temperature coefficient which causes the heating conductor to operate about a desired temperature in a self-regulating manner. Such self-regulating heating resistors are constructed, for example, from ceramic materials, such as, for example, barium titanate ceramics and/or doped polymers. Such self-regulating heating resistors allow simple actuation of the evaporation unit according to the invention, because regulation thereby takes place in a simple way through the use of the heating resistor itself.

In accordance with an added advantageous feature of the evaporation unit of the invention, the heating layer has an inner and an outer contact layer, between which the self-regulating heating resistor is formed.

The self-regulating heating resistor can be electrically contacted and operated in a simple way through the inner and the outer contact layers. Through the use of a full-area connection between the contact layers and the self-regulating resistor, low electrical resistances in the contact layers can be achieved, so that they do not have significantly increased temperatures even due to the ohmic heat. The inner contact layer preferably lies between the self-regulating heating resistor and the heat-imparting layer, while the outer contact layer is formed on the opposite side of the self-regulating heating resistor.

In accordance with an additional advantageous feature of the evaporation unit of the invention, the heat-imparting layer is constructed from a material including at least one of the following materials:
copper; or
aluminum.

Copper and/or aluminum have proved to be advantageous. On one hand, they have sufficiently high thermal conductivities of above 200 W/mK in the case of aluminum and of above 400 W/mK in the case of copper. Furthermore, these materials and their alloys can be sealed in with an evaporation cavity formed of titanium in a simple way. Moreover, these materials make it possible for their outer surface to be machined, thus allowing any desired shaping of the heat-imparting layer in the outer region, for example as a result of the introduction of recesses or the like.

Moreover, heating conductors can be soldered, in particular hard-soldered ("brazed") or soft-soldered ("soldered"), to copper and/or aluminum or their alloys in a simple way. These are the methods for material integral connection between the heating layer and the heat-imparting layer which can basically be employed advantageously within the scope of this invention in order to connect the heating layer to the heat-imparting layer.

In accordance with yet another advantageous feature of the evaporation unit of the invention, the evaporator cavity includes a channel.

In this case, the aqueous solution (reducing agent precursor) is conveyed into an inlet-side end of the channel where it evaporates due to contact with the heated walls of the channel. The evaporated aqueous solution flows through the channel to an end section at which the vapor leaves the evaporator cavity. Since the walls of the evaporator cavity or chamber are produced from titanium, titanium oxides are formed thereon and catalyze hydrolysis of the reducing agent precursor into reducing agent and, in particular, of the urea into ammonia. Thus, even during passage through the evaporator, at least partial hydrolysis of the reducing agent precursor into reducing agent occurs. The vapor which leaves the evaporation cavity therefore advantageously contains reducing agent and, in particular, ammonia. The channel may have a coiled and, in particular, meandering structure, that is to say, in particular, with at least two changes of direction. Furthermore, a straight channel may be formed. In addition, structures which project into the channel may be formed. This, advantageously, avoids a situation where droplets of the aqueous solution pass through the evaporator, without being evaporated. In the case of a channel, in particular, the heat-imparting layer and/or the heating layer are/is constructed concentrically or coaxially with respect to the channel.

In accordance with yet a further advantageous feature of the evaporation unit of the invention, the evaporator cavity has an inlet port for the supply of an aqueous solution. The inlet port is formed opposite part of the wall of the evaporator cavity.

This means that, during operation, aqueous solution entering through the inlet port impinges on the opposite heated wall of the evaporator cavity. Evaporation of the aqueous solution thereby occurs. In accordance with yet an added advantageous feature of the evaporation unit of the invention, the inlet port may additionally have a droplet addition device which is suitable for adding aqueous solutions at least partially in droplet form to part of the wall of the evaporator cavity.

In accordance with yet an additional advantageous feature of the evaporation unit of the invention, the droplet addition device may include, in particular, a nozzle which sprays the aqueous solution. Alternatively or additionally, a capillary may be formed in this case, in which droplets drop in to the evaporator cavity by being detached from the capillary margin.

Especially preferably, the droplet addition device includes a nozzle and, in particular, an atomizer nozzle, through the use of which the aqueous solution is introduced in droplet form into the evaporator cavity. Good distribution of the aqueous solution to various regions of the wall or of the inner space of the evaporator cavity is thereby achieved, so that there is no excessive local cooling of partial regions of the evaporator cavity.

In accordance with again another advantageous feature of the evaporation unit of the invention, the droplet addition device is suitable for applying at least one jet of droplets to part of the wall of the evaporator cavity.

A jet of droplets is formed at least partially of droplets of the aqueous solution which can preferably have different volumes. As a result of such an addition of droplets, good distribution of the aqueous solution on the wall or in the inner space of the evaporator cavity is possible.

In accordance with again a further advantageous feature of the evaporation unit of the invention, the evaporator cavity is made to taper at least in partial regions. This means that a free radius inside the evaporator cavity decreases or narrows in at least one direction. What is preferred in this case is a funnel-shaped or conical configuration of the evaporator cavity, at least in at least one partial region. A frustoconical configuration is also possible and used according to the invention.

The tapering structure of the evaporator cavity increases the possibility of contact with the droplets introduced into the evaporator cavity, at least in partial regions, during operation. The tapering partial region acts as a kind of droplet catcher which ensures that the corresponding droplets of the aqueous solution reliably come into contact with the wall.

In accordance with again an added advantageous feature of the evaporation unit of the invention, the surface quality of the wall of the evaporator cavity is different with regard to at least one of the elements of the group including roughness, patterning and coating. In particular, the wall is provided with different roughness, patterning and/or coating in the regions impinged by a jet of droplets or a spray cone of the aqueous solution from those in the other regions of the evaporator cavity.

In accordance with again an additional advantageous feature of the evaporation unit of the invention, the evaporator cavity is filled, at least in partial regions, with a woven or tangled configuration. The woven or tangled configuration is formed at least partially of a material promoting the hydrolysis of the aqueous solution, in particular of a material which includes titanium. The woven or tangled configuration is, in particular, connected in a thermally conductive manner to the wall of the evaporator cavity or chamber. The woven or tangled configuration is formed in this case, in particular, of at least one wire, preferably of a multiplicity of wires. The wire/wires has/have, in particular, materially integral connections with itself or with one another, so that uniform heat distribution within the tangled or woven configuration is achieved through the use of the connections. The woven or tangled configuration has, in particular, a packing density of 2 to 25%.

The woven or tangled configuration provides a very large evaporator surface. Particularly due to the woven or tangled configuration being placed in the spray cone of the aqueous solution introduced into the evaporator cavity, a further reduction in size of the droplets of the aqueous solution is thus achieved, and evaporation is thereby improved.

Advantageously, the woven or tangled configuration forms the wall of the evaporator cavity or chamber and is connected in a thermally conductive manner to the heat-imparting layer of the evaporation unit.

In this case, a thermally conductive connection includes, in particular, a contact between the surfaces of the woven or tangled configuration and the wall or the heat-imparting layer. The contact may likewise be ensured by an at least partially form-locking connection of the woven or tangled configuration to the wall of heat-imparting layer. A form-locking connection is one which connects two elements together due to the shape of the elements themselves, as opposed to a force-locking connection, which locks the elements together by force external to the elements.

In accordance with still another especially advantageous feature of the evaporation unit of the invention, the woven or tangled configuration is placed only along the inner wall of the evaporator cavity, in particular so that the evaporator cavity is filled between 10% and 40% by the woven or tangled configuration. Since the woven or tangled configuration itself has a low packing density, only at most 10% of the evaporator cavity is acted upon by the woven or tangled configuration (that is to say only by the material, without pores).

Preferably, that region of the evaporator cavity which is acted upon by the spray cone of the aqueous solution emerging from a nozzle into the evaporator cavity is, at least for the most part, not filled by the woven or tangled configuration (free spray cone). In particular, that region of the inner wall of the evaporator cavity which is acted upon by the spray cone is not covered by the woven or tangled configuration either. This may be advantageous particularly in the event of the introduction of larger droplets of the aqueous solution which are then finely atomized due to impingement on the inner wall surface of the evaporation cavity or chamber and which only then evaporate from the evaporator surface provided by the woven or tangled configuration.

In accordance with still a further advantageous feature of the evaporation unit of the invention, the woven or tangled configuration itself is formed as a regulated or self-regulating resistance heater, in particular as a titanium-coated heating conductor.

In accordance with still an added advantageous feature of the evaporation unit of the invention, a hydrolysis catalyst body or catalytic converter body is formed downstream of the evaporator cavity.

The hydrolysis catalyst body has a hydrolysis catalyst coating which catalyzes the hydrolysis of urea into ammonia. This markedly increases the fraction of ammonia, in particular a gas stream can thus be produced in which 90% and more of the urea used has been converted into ammonia, in particular even more than 95%, especially preferably more than 98%.

With the objects of the invention in view, there is also provided a device, comprising at least one reservoir, a pump, an evaporation unit according to the invention, and at least one line section at least partially interconnecting the at least one reservoir, the pump and the evaporation unit.

Through the use of such a device, it is possible to produce a compact device for the provision of ammonia.

With the objects of the invention in view, there is concomitantly provided a motor vehicle, comprising an internal combustion engine and an exhaust system having at least one SCR catalyst body and at least one connection to an evaporation unit according to the invention or to a device according to the invention. The at least one connection is disposed between the internal combustion engine and the at least one SCR catalyst body, for introducing gaseous reducing agent and/or a gaseous reducing agent precursor into the exhaust system and as a flow to the at least one SCR catalyst body.

The details and advantages disclosed for the evaporation unit can be transferred and applied to the corresponding device and the motor vehicle, and vice versa.

The embodiment of an evaporation unit with at least a plurality of the following properties is most especially preferred:

- the wall of the evaporation unit (at least of the surfaces to be wetted) includes a titanium material;
- the wall is wound around with at least one heating conductor and, if appropriate, is cast with it (for example, in the manner of a multilayer construction);
- the walls of the at least one heating conductor can be surrounded (completely or partially) by a material for heat equalization (such as, for example, a copper or aluminum material);
- at least one of the heating conductors includes a PTC element;
- the form of the evaporation unit or the position of the at least one droplet discharge is selected in such a way that the injection jet, as far as possible, wets the entire surface of the wall which is provided;
- the addition of the reducing agent/reducing agent precursor takes place through the use of an injection nozzle (if appropriate, a plurality of injection nozzles) and/or a metering channel;
- the outlet from the evaporator cavity is offset with respect to the droplet discharge (not opposite and not in the direct jet range);
- the opening of the injection nozzle and/or of the metering channel toward the evaporator cavity is unheated and preferably has a diameter of less than 10 mm, in particular of less than 5 mm;
- the evaporator cavity or chamber is constructed (in cross section) in the manner of a double cone;
- a heatable droplet separator is provided downstream of the evaporator cavity, if appropriate followed by a hydrolysis catalyst or catalytic converter; and
- a hydrolysis catalyst or catalytic converter has a concentric structure with respect to the evaporator cavity or the evaporation unit.

Other features which are considered as characteristic for the invention are set forth in the appended claims, noting that the features specified individually in the dependently formulated claims can be combined with one another in any desired technologically expedient way and exhibit further refinements of the invention.

Although the invention is illustrated and described herein as embodied in an evaporation unit for producing a gas including at least one reducing agent precursor and/or a reducing agent and a device and a motor vehicle having the evaporation unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
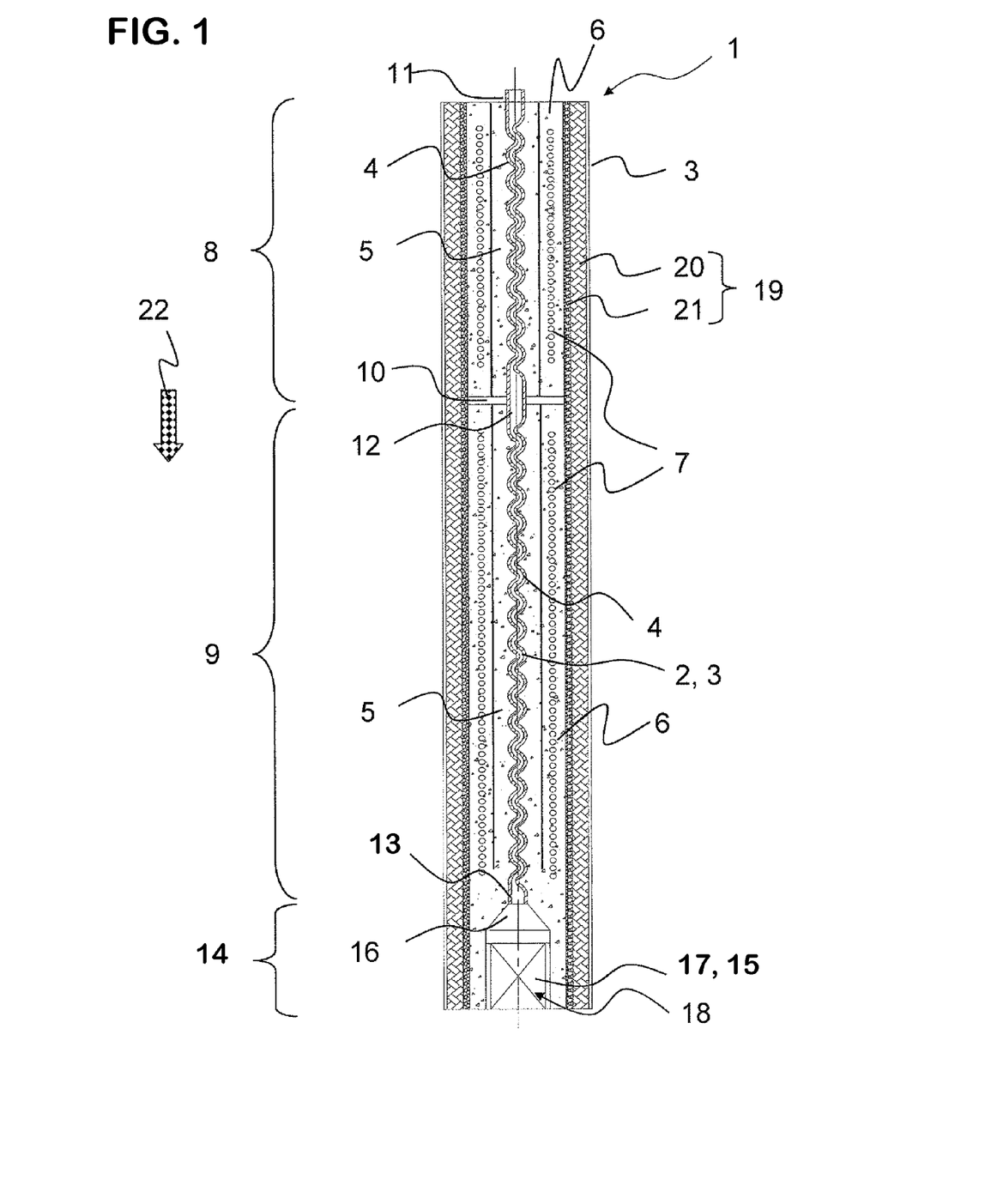
FIG. 1 is a diagrammatic, longitudinal-sectional view of a first embodiment of an evaporation unit according to the invention.

Referring now in detail to the figures of the drawings, which show details of exemplary embodiments to which the invention is not restricted, and first, particularly, to FIG. 1 thereof, there is seen a diagrammatically illustrated structural variant of an evaporation unit 1 according to the invention. The evaporation unit 1 serves for the evaporation of an aqueous solution including at least one reducing agent precursor, in particular a urea/water solution. The evaporation unit 1 includes an evaporator chamber or cavity 2, which is constructed as a channel 3 in the present exemplary embodiment. The evaporator cavity 2 is delimited by a wall 4 formed of titanium. The channel 3 is coiled in a meandering manner, that is to say it is constructed with at least two deflections which ensure that no unevaporated urea/water solution passes through the channel 3 without coming into contact with the wall 4.

Titanium oxide is formed on the inner surface of the wall 4 by oxidation with atmospheric oxygen and catalyses the hydrolysis of urea into ammonia. A heat-imparting or exchanging layer 5 is formed around the evaporator cavity 2. In this respect, the channel 3 is embedded into a corresponding body formed from the heat-imparting or thermally-conductive layer 5. The latter may be obtained, in particular, by sealing-in the evaporator cavity 2 through the use of a material including copper and/or aluminum. A heating layer 6 is formed around the heat-imparting layer 5. This heating layer 6 is formed, in the present example, of a layer of aluminum, into which a heating conductor 7 is incorporated. The latter is connectable to corresponding, non-illustrated current sources, so that the heating layer 6 can be heated through the use of ohmic heat. In the present exemplary embodiment, the evaporation unit 1 has a first evaporation section 8 and a second evaporation section 9 (independent heating zones). These sections are separated by a gap 10 in the heat-imparting layer 5 and the heating layer 6.

When the evaporation unit 1 is in operation, the channel 3 is fed with liquid urea/water solution through an inlet 11. This flow through the channel 3 is in a flow direction 22. The liquid urea/water solution is evaporated in the first evaporation section 8 in the channel. The urea/water solution, which is then at least partially vaporous, leaves the first evaporation section 8 through a straight intermediate piece 12 of the channel 3 and then flows through the channel in the second evaporation section 9. There, heat is introduced by the heating layer 6, through the use of which the vapor of the urea/water solution is heated further in the second evaporation section 9 in the channel 3, and existing liquid fractions from the urea/water solution are evaporated. The titanium oxide regions inside the channel 3 catalyze and improve the hydrolysis of urea into ammonia.

The evaporated urea/water solution with fractions of ammonia leaves the channel through an outlet 13 and enters a reaction zone 14. This reaction zone 14 includes a hydrolysis catalyst body or catalytic converter body 15 which is connected to the outlet 13 of the channel 3 through an inlet cone 16. The hydrolysis body 15 includes a honeycomb body 17 as a catalyst carrier body which is provided with a coating 18 catalyzing the hydrolysis of urea into ammonia.

In this exemplary embodiment, thermal insulation 19, which includes a ceramic layer 20 and a ceramic tube 21, is provided outside the heating layer 6.

Figure 2:
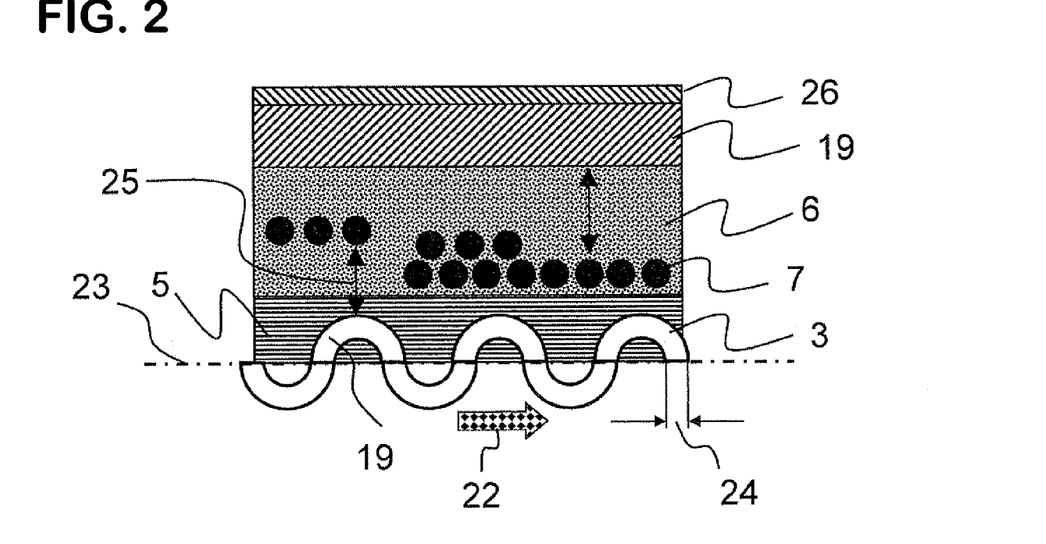
FIG. 2 is a fragmentary, longitudinal-sectional view of a second embodiment of an evaporation unit.

FIG. 2 shows details of a further embodiment of the evaporation unit 1 in a fragmentary, sectional view. The bottom of FIG. 2 illustrates how the flow channel 3 oscillates or weaves regularly about a central axis 23. The channel 3 in this case, has a diameter 24 of, for example, 4 mm. Moreover, a hydrolysis coating 18 is provided inside the channel 3 or on its wall 4. However, the channel 3 is cast in a heat-imparting layer 5 which is connected in a materially integral manner to a heating layer 6 in which the heating conductors 7 are also provided in the manner of a helical winding. In this case, a heating conductor 7, which is indicated in a left-hand region, is positioned at a specific distance 25 from the channel 3. A plurality of heating conductors 7, which are provided further to the right, partially overlap one another, in particular in a closer configuration to one another, at a distance 25 from a housing 26 surrounding the evaporation unit 1 or from the thermal insulation 19, which is increased in this case, so that these heating conductors 7 are provided nearer to the channel 3. It is possible to vary the temperature profile in the channel (different heating zones) by varying the distance 25 between a heating conductor 7 and a channel 3.

Figure 3:
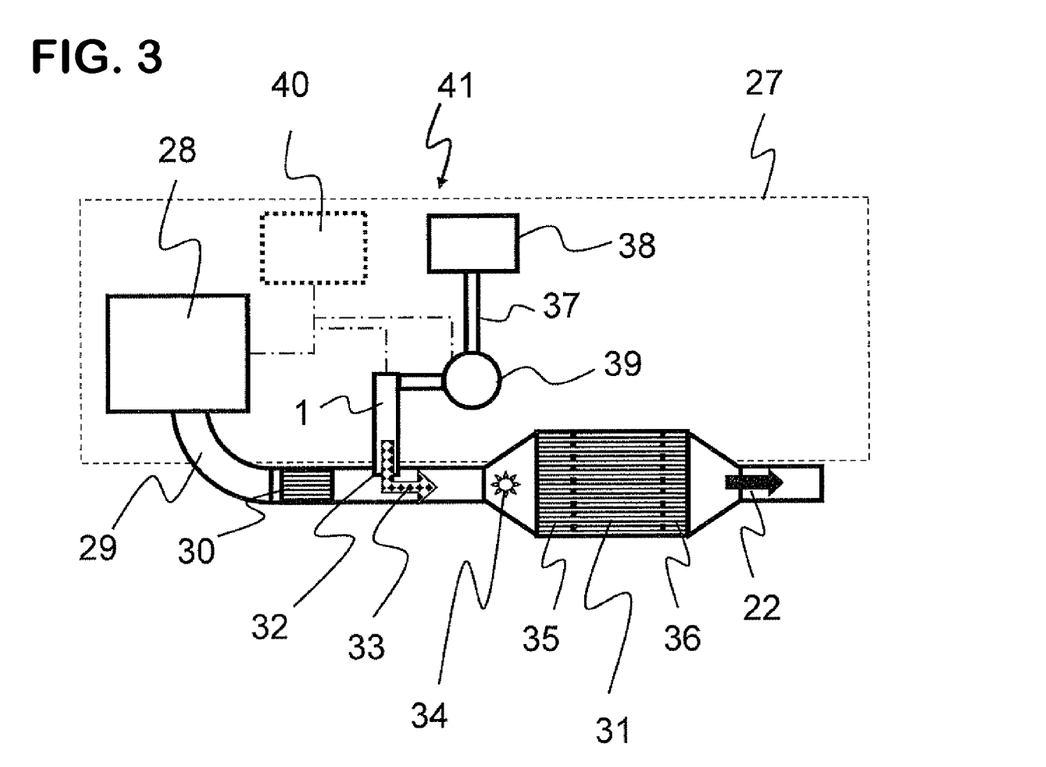
FIG. 3 is a plan view of an assembly of an SCR system in a motor vehicle.

FIG. 3 diagrammatically shows a motor vehicle 27, in particular a passenger car or a truck. Exhaust gas generated in an internal combustion engine 28 is purified by a corresponding exhaust system 29 and is discharged into the surroundings. In this case, the exhaust gas flows in the flow direction 22, first through a catalytic converter 30 (for example, an oxidizing catalytic converter), in order to finally impinge on an SCR catalyst body or catalytic converter body 31 further downstream. A port or connection 32 for the evaporation unit 1 according to the invention is provided between the catalytic converter 30 and the SCR catalyst body 31, so that a gas stream 33 including ammonia is introduced there. The exhaust gas stream impregnated with ammonia then arrives, where appropriate, at a flow influencer or manipulator 34 (for example, a static mixer), before this mixture reaches the SCR catalyst body 31. For the sake of completeness, it should be noted herein that the SCR catalyst or catalytic converter may be provided in an inlet region 35 and/or in an outlet region 36 with further exhaust gas treatment components such as, for example, a particle separator in the inlet region 35 and/or an oxidizing catalyst or catalytic converter in the outlet region 36. It may likewise be pointed out that other exhaust gas treatment devices may also be provided in the exhaust system 29.

The evaporation unit 1 according to the invention is connected through a plurality of line sections 37 to a reservoir 38. A liquid urea/water solution which is, for example, provided in the reservoir 38, is then supplied through the use of a metering pump 39 to the evaporation unit 1 in a time-dictated and/or volume-dictated manner. Alternatively, instead of a metering pump 39, a pump may be provided which keeps a pressure in reserve, with metering into the evaporation unit 1 taking place through a non-illustrated valve.

The metering pump 39, the evaporation unit 1 and/or the internal combustion engine 28, may be connected to a controller 40 (by a databus and/or operatively), in order to ensure a regulated admixture of urea/water solution to the evaporation unit 1 or of ammonia gas to the exhaust gas in this case.

Merely for the sake of completeness, it may be pointed out that a device 41 including at least one reservoir 38, a line section 37, a metering pump 39 and an evaporation unit 1, may be constructed and offered in any desired quantities, even separately, as a component kit with or without the controller 40. Alternatively, the device 41 may include a pump and a metering valve, instead of the metering pump 39.

Figure 4:
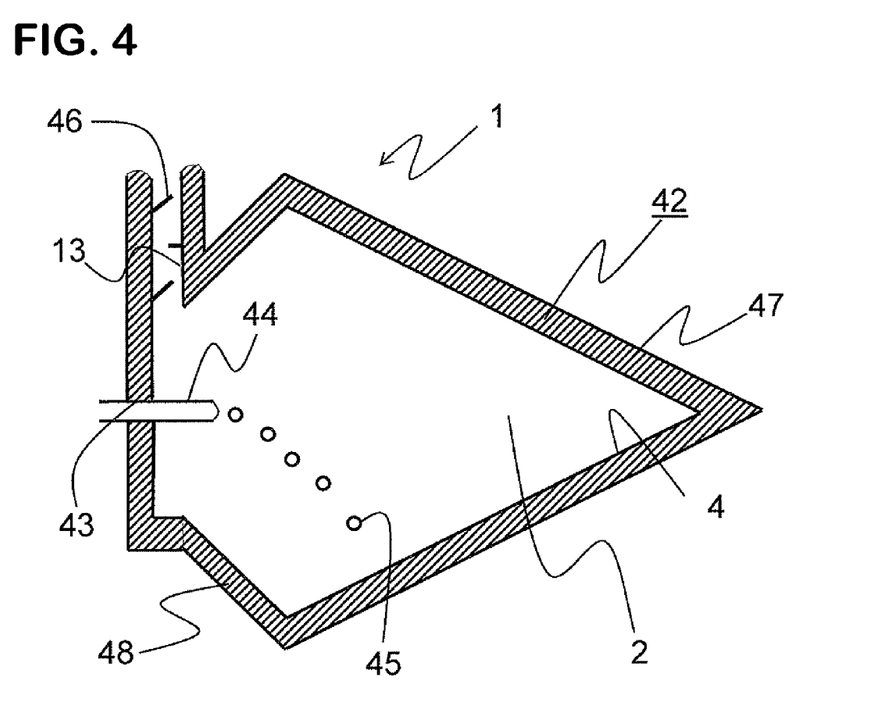
FIG. 4 is a cross-sectional view of a third embodiment of an evaporation unit.
Figure 8:
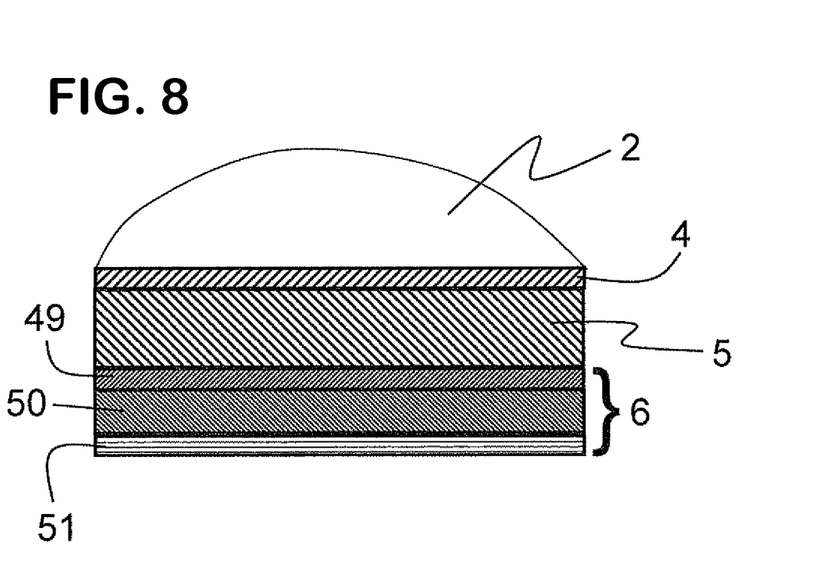
FIG. 8 is a fragmentary, cross-sectional view of a seventh embodiment of an evaporation unit.
Figure 9:
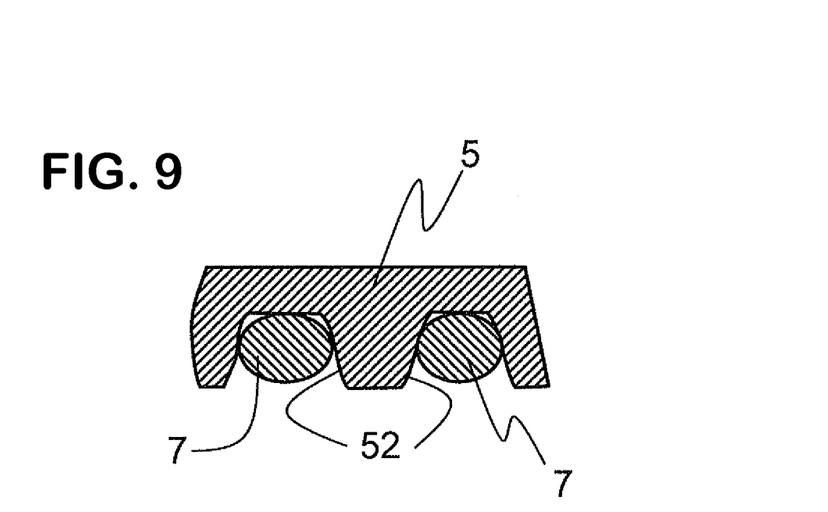
FIG. 9 is a further fragmentary, cross-sectional view of an eighth embodiment of an evaporation unit.

FIG. 4 diagrammatically shows an embodiment of an evaporation unit 1 with an evaporator cavity 2 having a volume which is delimited by a wall structure 42 shown by way of example in FIGS. 8 and 9. The evaporator cavity 2 has an inlet port 43 for supplying urea/water solution. The inlet port 43 is formed opposite part of the wall structure 42 and therefore of the wall 4. During operation, droplets 45 of the urea/water solution are administered through the use of a droplet addition device formed as a small tube 44, for example as a capillary, passing through the inlet port 43, into the evaporator cavity 2, and they impinge on the inside of the wall 4 of the wall structure 42 and evaporate there. The wall structure 42 likewise includes the heating layer, through the use of which electrical heating of the volume of the evaporator cavity 2 takes place. The evaporated urea/water solution, which may already contain fractions of ammonia since the wall 4 is made from titanium and because of the correspondingly present titanium oxide, exits the evaporator cavity 2 through an outlet 13. The latter has projections 46 which prevent not yet evaporated urea/water solution from passing, unevaporated, through the outlet 13. Alternatively or additionally, the outlet 13 may be constructed in a coiled manner and/or with a plurality of deflections. The projections 46 are in thermal contact with the heating layer 6 so that, when the urea/water solution is contact with the projections 46, evaporation takes place. The outlet 13 may be followed by a non-illustrated hydrolysis catalyst body, in order to increase the ammonia fraction in the gas. The evaporator cavity 2 has a tapering partial region 47 which has a funnel-shaped structure. Furthermore, the evaporator cavity has an opening partial region 48.

Figure 5:
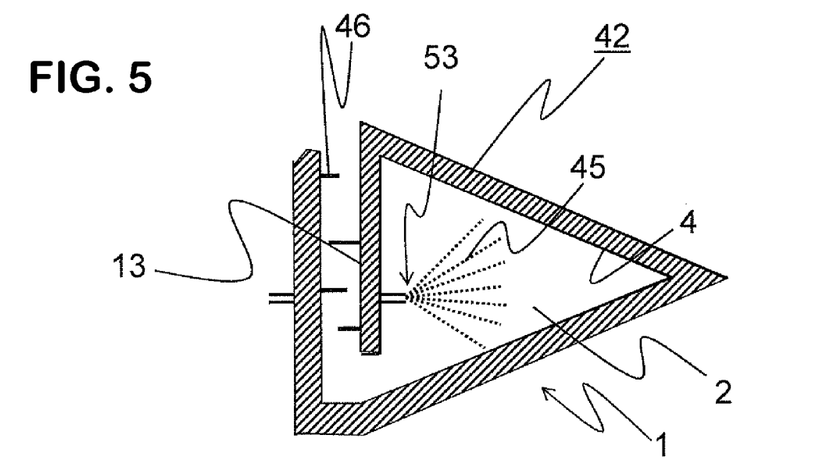
FIG. 5 is a cross-sectional view of a fourth embodiment of an evaporation unit.

FIG. 5 diagrammatically shows a fourth embodiment of an evaporation unit 1 which is constructed to taper conically. The evaporation unit 1 has an evaporator cavity 2 which is delimited by a wall structure 42 and the inner wall 4 of which is constructed from titanium. Furthermore, the evaporation unit 1 has a droplet addition device constructed as a nozzle 53 which, during operation, applies a plurality of jets of droplets with droplets 45 of urea/water solution to the wall 4 of the evaporator cavity. The outlet 13 is configured in a similar way to the exemplary embodiment shown in FIG. 4.

Figure 6:
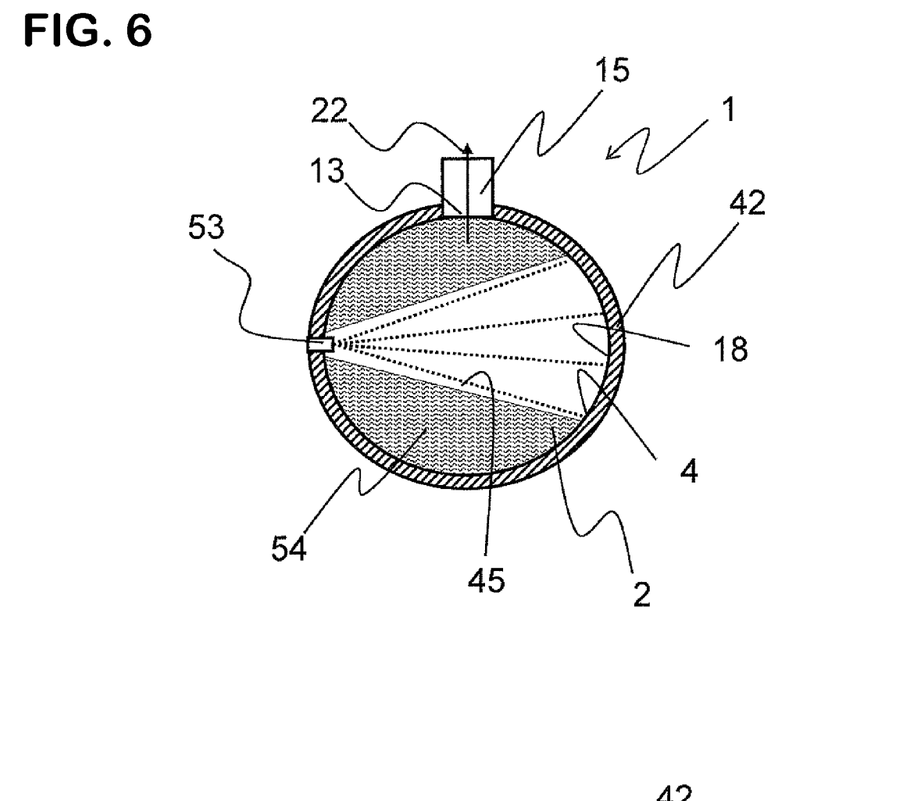
FIG. 6 is a cross-sectional view of a fifth embodiment of an evaporation unit.

FIG. 6 diagrammatically shows a fifth embodiment of an evaporation unit 1 which has a spherical structure. The evaporation unit 1 has an evaporator cavity 2 which is delimited by a wall structure 42 and the inner wall 4 of which is provided at least partially with a hydrolysis coating 18. The evaporation unit 1 has a nozzle 53 which, during operation, discharges a plurality of jets of droplets with droplets 45 of urea/water solution onto the wall 4 of the evaporator cavity 2.

The outlet 13 is located in a region outside the spray cone, formed by the jets of droplets, of the nozzle 53 and has a hydrolysis catalyst or catalytic converter 15 which is connected directly to the evaporation unit 1 and through which the at least partially converted urea/water solution, which is then present at least partially as vapor, flows in the flow direction 22. The evaporator cavity 2 is filled partially with a woven or tangled configuration 54. There is preferably no woven or tangled configuration 54 placed in the region of the spray cone which is generated by the nozzle 53. The droplets 45 impinge on the wall 4 of the evaporation unit 1 and are finely atomized there. An enlarged hot surface is provided in the evaporation unit 1 due to the woven/tangled configuration 54, so that complete evaporation and/or as far as possible thorough conversion of the urea/water solution into ammonia are/is made possible. The vaporous solution leaves the evaporator cavity 2 through the outlet 13.

Figure 7:
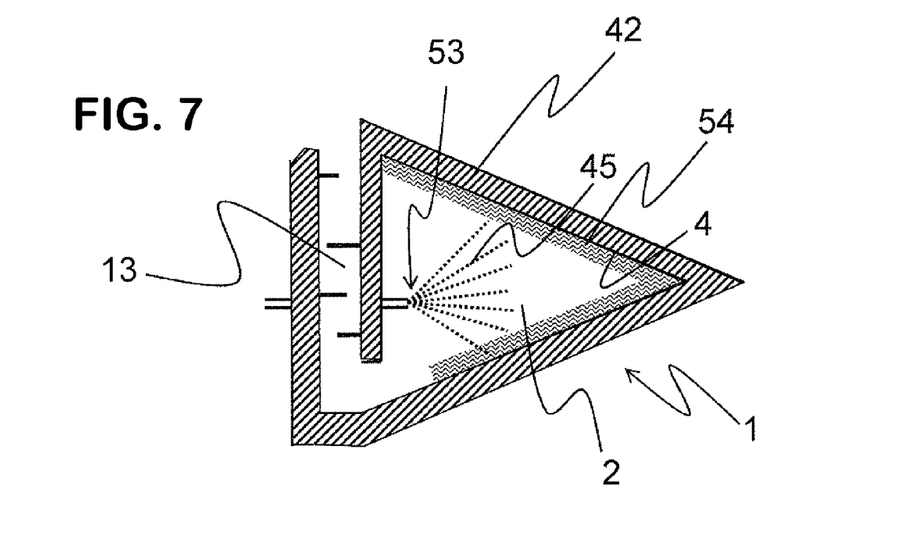
FIG. 7 is a cross-sectional view of a sixth embodiment of an evaporation unit.

FIG. 7 diagrammatically shows a sixth embodiment of an evaporation unit 1 which is constructed to taper conically. The evaporation unit 1 has an evaporator cavity 2 which is delimited by a wall structure 42, of which the inner wall 4 is at least partially provided with a woven/tangled configuration 54. Furthermore, the evaporation unit 1 has a droplet addition device which is constructed as a nozzle 53. The urea/water solution is finely atomized, converted and evaporated through the use of the woven/tangled configuration 54 which is heated as a result of direct contact with the wall 4. As already illustrated in FIG. 6, the region of the spray cone can also be kept free of the woven/tangled configuration 54 in this case, so that the droplets 45 impinge directly on the wall 4. The embodiments of the evaporation unit 1 which are shown in FIGS. 4, 5, 6 and 7 may likewise advantageously be used in a device 47.

FIG. 8 shows, by way of example, a wall structure 42 which may be chosen for one of the exemplary embodiments according to FIGS. 4 to 7, as well as for an exemplary embodiment having a channel 3 as an evaporator cavity 2. The evaporator cavity 2 is delimited by the wall 4 which is constructed from titanium. The heat-imparting layer 5 made of aluminum and/or copper is connected in a thermally conductive manner to the wall 4. A heating layer 6 is connected on the outside in a materially integral manner, in particular brazed, to this heat-imparting layer 5. In this exemplary embodiment, the heating layer 6 includes, from the inside outward, an inner contact layer 49, a self-regulating heating resistor 50 and an outer contact layer 51. The self-regulating heating resistor 50 is electrically contacted and operated through the use of the inner layer 49 and the outer contact layer 51. This heating layer 6 may be surrounded on the outside by thermal insulation and heats the heat-imparting layer 5. The inner contact layer 49, self-regulating heating resistor or conductor 50 and outer contact layer 51 are constructed coaxially and concentrically with respect to one another and may also form coaxial and concentric tubes.

FIG. 9 diagrammatically shows details of a further example of a wall structure 42. Recesses 52 are formed on the outside of the heat-imparting layer 5. At least one heating conductor 7 is inserted into the recesses and brazed to the heat-imparting layer 5. The recesses 52, in particular, have a thread-like form and run continuously around the evaporator cavity 2.

The evaporation unit 1 according to the invention may advantageously be employed to provide gaseous ammonia from a urea/water solution. As a result of the structure with a heating layer which can preferably be heated electrically, a highly dynamic control can be set up, through the use of which a sufficiently large quantity of ammonia can be provided even in the event of rapid load changes and resulting sharp rises in nitrogen oxide concentrations in the exhaust gas of the internal combustion engine. By virtue of the compact form of construction of the evaporation unit 1, the latter can be advantageously employed in mobile applications, such as in the exhaust systems 29 of motor vehicles.

The invention claimed is:

1. An evaporation unit for the evaporation of an aqueous solution including at least one reducing agent precursor, the evaporation unit comprising:
    a wall made of a material including titanium, said wall delimiting at least one evaporator cavity;
    a heat-imparting layer made of a material with a thermal conductivity of at least 100 W/mK (Watts per meter and Kelvin), said heat-imparting layer lying outside said evaporator cavity and being thermally conductively connected to said evaporator cavity; and
    a heating layer disposed outside of said heat-imparting layer and being materially integrally connected to said heat-imparting layer, said heating layer including a first heating zone and a second heating zone disposed next to said first heating zone in a direction of flow of the aqueous solution within said evaporator cavity, said second heating zone being operable independently of said first heating zone and being configured for operating at a higher temperature than said first heating zone.

2. The evaporation unit according to claim 1, which further comprises at least one heating conductor inserted into at least one externally continuous recess formed in said heat-imparting layer and brazed to said heat-imparting layer.

3. The evaporation unit according to claim 1, wherein said heating layer includes at least one self-regulating heating resistor.

4. The evaporation unit according to claim 3, wherein said heating layer has an inner contact layer and an outer contact layer, between which said at least one self-regulating heating resistor is disposed.

5. The evaporation unit according to claim 1, wherein said heat-imparting layer is constructed from a material including at least one of the following materials:
    a) copper; or
    b) aluminum.

6. The evaporation unit according to claim 1, wherein said evaporator cavity includes a channel.

7. The evaporation unit according to claim 1, which further comprises an inlet port for supplying the aqueous solution to said evaporator cavity, said inlet port disposed opposite a part of said wall delimiting said evaporator cavity.

8. The evaporation unit according to claim 7, which further comprises a droplet addition device for applying the aqueous solution at least partially in droplet form to a part of said wall delimiting said evaporator cavity.

9. The evaporation unit according to claim 8, wherein said droplet addition device includes an atomizer nozzle.

10. The evaporation unit according to claim 7, wherein said evaporator cavity tapers at least in partial regions.

11. The evaporation unit according to claim 7, wherein said evaporator cavity has a funnel shape at least in at least one partial region.

12. The evaporation unit according to claim 1, which further comprises a woven or tangled configuration disposed inside said evaporator cavity.

13. The evaporation unit according to claim 1, which further comprises a hydrolysis catalyst body disposed downstream of said evaporator cavity.

14. The evaporation unit according to claim 1, further comprising heat conductors provided in said heating zones, said heating conductors in said second zone being nearer to said evaporator cavity than said heating conductors in said first zone.

15. The evaporation unit according to claim 1, wherein, said first heating zone and said second zone are separated by a gap.

16. The evaporation unit according to claim 1, wherein, said evaporator cavity is cast in a heat-imparting layer.

17. A device, comprising:
at least one reservoir;
a pump;
an evaporation unit according to claim 1; and
at least one line section at least partially interconnecting said at least one reservoir, said pump and the evaporation unit.

18. A motor vehicle, comprising:
an internal combustion engine; and
an exhaust system having at least one SCR catalyst body and at least one connection to an evaporation unit according to claim 1;
said at least one connection being disposed between said internal combustion engine and said at least one SCR catalyst body, for introducing gaseous reducing agent and/or a gaseous reducing agent precursor into said exhaust system and to said at least one SCR catalyst body.

19. A motor vehicle, comprising:
an internal combustion engine; and
an exhaust system having at least one SCR catalyst body and at least one connection to a device according to claim 17;
said at least one connection being disposed between said internal combustion engine and said at least one SCR catalyst body, for introducing gaseous reducing agent and/or a gaseous reducing agent precursor into said exhaust system and to said at least one SCR catalyst body.

* * * * *